(12) United States Patent
Jeanneteau et al.

(10) Patent No.: US 12,532,385 B2
(45) Date of Patent: Jan. 20, 2026

(54) METHOD FOR OPERATING AN INDUCTION HOB AND INDUCTION HOB

(71) Applicant: ELECTROLUX APPLIANCES AKTIEBOLAG, Stockholm (SE)

(72) Inventors: Laurent Jeanneteau, Compiègne (FR); Alex Viroli, Forli (IT); Massimo Nostro, Forli (IT); Federico Balest, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 1099 days.

(21) Appl. No.: 17/469,977

(22) Filed: Sep. 9, 2021

(65) Prior Publication Data

US 2021/0410237 A1    Dec. 30, 2021

Related U.S. Application Data

(63) Continuation of application No. 17/255,023, filed as application No. PCT/EP2019/065504 on Jun. 13, 2019, now Pat. No. 11,153,939.

(30) Foreign Application Priority Data

Jun. 25, 2018  (EP) .................................. 18179604

(51) Int. Cl.
H05B 6/06 (2006.01)
H05B 6/12 (2006.01)

(52) U.S. Cl.
CPC ........... *H05B 6/062* (2013.01); *H05B 6/1272* (2013.01)

(58) Field of Classification Search
CPC .................. H05B 6/062; H05B 1/0202; H05B 2213/05; H05B 6/04; H05B 6/06; H05B 6/065;
(Continued)

(56) References Cited

U.S. PATENT DOCUMENTS

| 4,211,912 A | 7/1980 | Kluchi |
| 2007/0125768 A1 | 6/2007 | Kim |

(Continued)

FOREIGN PATENT DOCUMENTS

| EP | 2306784 | 4/2011 |
| EP | 3091817 | 11/2016 |
| WO | 2016177583 | 11/2016 |

OTHER PUBLICATIONS

International Search Report and Written Opinion for PCT/EP2019/065504, dated Sep. 12, 2019, 10 pages.

*Primary Examiner* — Chris Q Liu
(74) *Attorney, Agent, or Firm* — Chrisman Gallo Tochtrop LLC

(57) ABSTRACT

An engine pylon that is used for supporting an engine on a main wing, the pylon including a first drain that is configured to discharge a flammable liquid leaking from a pipe provided within a predetermined region in the pylon into outside air from inside of the predetermined region; and a ventilation path configured to bring the inside of the predetermined region into communication with the outside air. The engine pylon includes a pylon body and a pylon fairing that covers the pylon body. The pylon body includes at least an upper pylon and a lower pylon that project forward from a front spar of the main wing. The predetermined region is defined by the pylon fairing and the upper pylon. The ventilation path is provided in the upper pylon and the pylon fairing that covers the upper pylon.

16 Claims, 2 Drawing Sheets

(58) Field of Classification Search
CPC ........... H05B 6/1236; H05B 1/0258; H05B 2213/03; H05B 6/1209; H05B 6/1218; H05B 2213/07; H05B 2213/06
USPC ....... 219/626, 665, 620, 660, 506, 601, 621, 219/627, 663, 667, 746
See application file for complete search history.

(56) References Cited

U.S. PATENT DOCUMENTS

| | | | |
|---|---|---|---|
| 2007/0221668 A1 | 9/2007 | Baarman | |
| 2013/0175259 A1 | 7/2013 | Brosnan | |
| 2014/0197160 A1 | 7/2014 | Shan | |
| 2015/0083712 A1* | 3/2015 | Viroli | F24C 7/087 |
| | | | 219/626 |
| 2015/0245417 A1* | 8/2015 | Fattorini | H05B 6/065 |
| | | | 219/662 |
| 2016/0037584 A1* | 2/2016 | Viroli | G01V 3/104 |
| | | | 324/207.17 |
| 2016/0073451 A1 | 3/2016 | Reischmann | |
| 2016/0113068 A1 | 4/2016 | Schmitt | |
| 2016/0174297 A1* | 6/2016 | Herzog | H05B 6/062 |
| | | | 219/625 |
| 2018/0103511 A1* | 4/2018 | Frank | H05B 6/1209 |

* cited by examiner

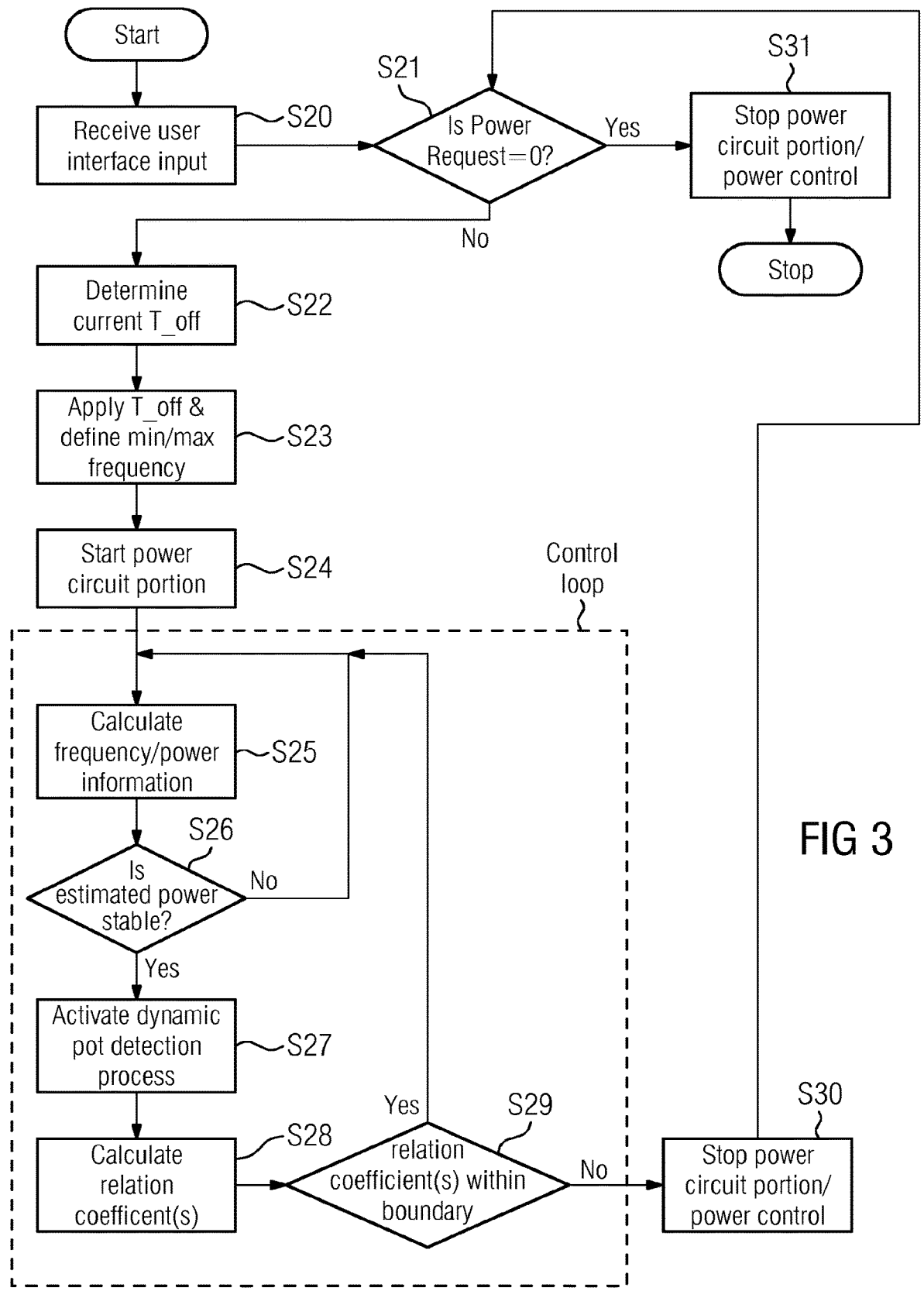

METHOD FOR OPERATING AN INDUCTION HOB AND INDUCTION HOB

CROSS REFERENCE TO RELATED APPLICATIONS

This application is a continuation of U.S. application Ser. No. 17/255,023 filed on Dec. 22, 2020, which is a US national phase of PCT/EP2019/065504 filed on Jun. 13, 2019, which claims the benefit of European application no. 18179604.6 filed on Jun. 25, 2018.

The present invention relates generally to the field of induction hobs, specifically to quasi-resonant induction hobs. More specifically, the present invention relates to a method for controlling operating parameters of a switching element of an induction hob in order to compensate change of coupling conditions between piece of cookware and induction coil during delivery of electric power to the induction coil and in order to minimize power interruptions.

BACKGROUND OF THE INVENTION

Induction hobs for preparing food are well known in prior art. Induction hobs typically comprise at least one induction coil placed below a hob plate in order to heat a piece of cookware.

For provision of power to the induction coil, the induction hob comprises a power circuit portion which provides pulsed electric power to the induction coil. Said power circuit portion comprises one or more switching elements (e.g. IGBTs) for generating said pulsed power.

A critical, limiting parameter in said power circuit portion is the collector-emitter voltage level ($V_{CE}$) of said switching elements. Defining an activation pulse length of the switching element (in the following also referred to as on-time T_on), a deactivation pulse length (in the following also referred to as off-time T_off) or deactivation pulse length range may be required in order to avoid damages and/or high power losses at the switching elements which would significantly reduce lifetime of the switching element. Said deactivation pulse length may depend on the coupling characteristic between said piece of cookware and said induction coil.

Common induction hobs periodically stop the provision of power to the induction coil and measure coupling characteristics, respectively, off-time T_off during said power interruption in order to adapt T_off according to changing coupling conditions.

Disadvantageously, significant power losses occur due to said periodical power interruptions.

SUMMARY OF THE INVENTION

It is an objective of the embodiments of the invention to provide a method for operating an induction hob which enables a proper driving of the power switch and minimize said power losses. If not explicitly indicated otherwise, embodiments of the invention can be freely combined with each other.

According to an aspect, the invention relates to a method for operating an induction hob. The induction hob comprises a power circuit portion with at least one switching element adapted to provide pulsed electric power to an induction coil and a control entity for controlling operating parameters of the switching element. Said method for operating an induction hob comprises the steps of:

performing a control loop with control cycles in order to detect coupling changes between the induction coil and a piece of cookware, said control cycles comprising the steps of:

receiving frequency information and power information at said control entity;

calculating at least one relation coefficient based on said frequency information and said power information; and comparing said relation coefficient with a relation coefficient boundary, thereby deriving a comparison result;

deciding, based on the comparison result, whether to:

perform a new control cycle of said control loop or whether to stop said control loop and said provision of pulsed electric power to the induction coil and restart said control loop after updating an operating parameter of the switching element.

Said relation coefficient may be indicative for changes of coupling coefficient between the induction coil and the piece of cookware placed above said induction coil.

Said method is advantageous because due to said control cycle it is possible to determine if only small changes of coupling characteristics occurred (crossing of relation coefficient boundary) which do not require any changes of operating parameters of the switching element or if significant changes occurred which are considered detrimental for the power circuit portion, specifically said at least one switching element included in the power circuit portion. Thereby, no periodical interruptions of power provision to the induction coil are required and therefore power losses are minimized.

According to embodiments, said frequency information is indicative for the current frequency of pulsed electric power provided to the induction coil and wherein said power information is indicative for the power currently provided to the piece of cookware. Based on said information it is possible to determine dynamic coupling changes between the induction coil and the piece of cookware placed above said induction coil (i.e. coupling changes during power provision to the induction coil).

According to embodiments, said at least one relation coefficient is calculated based on frequency trend information, said frequency trend information indicating the frequency change between different control cycles, specifically between two or more subsequent control cycles. So, in other words, said frequency trend information is indicative whether frequency of pulsed electric power provided to the piece of cookware is rising or falling in a sequence of multiple control cycles. Said frequency trend information may be calculated by a quotient of frequency currently provided to the induction coil and frequency provided to the induction coil in the last control cycle.

According to embodiments, said at least one relation coefficient is calculated based on power trend information, said power trend information indicating the power change between different control cycles, specifically between two or more subsequent control cycles. So, in other words, said power trend information is indicative whether electric power provided to the piece of cookware is rising or falling. Said power trend information may be calculated by a quotient of power currently provided to the induction coil and power provided to the piece of cookware in the last control cycle.

According to embodiments, a first relation coefficient is calculated based on a multiplication of frequency information and power information, specifically based on a multiplication of frequency trend information and power trend information. Said first relation coefficient may be indicative for a linear, respectively, proportional ratio trend of coil/pot coupling.

According to embodiments, a first relation coefficient is calculated based on the following formula:

$$Ds'[\%] = \frac{Fs * Ps}{100\%};$$

wherein
Fs is a quotient of the current frequency of pulsed electric power provided to the induction coil and the frequency of pulsed electric power provided to the induction coil in the previous control cycle; and
Ps is a quotient of a value indicative for the current estimated power provided to the piece of cookware and a value indicative for the estimated power provided to the piece of cookware in the previous control cycle.

According to embodiments, a second relation coefficient is calculated based on a multiplication of deviations of frequency information from a frequency target value and power information from a power target value, specifically based on a multiplication of deviations of frequency trend information from a target value and power trend information from a target value. Said second relation coefficient may be indicative for a parabolic ratio trend of coil/pot coupling.

According to embodiments, a second relation coefficient is calculated based on the following formula:

$$Ds''[\%] = 100\% + \{(100\% - Fs[\%]) * (100\% - Ps[\%])\};$$

wherein
Fs is a quotient of the current frequency of pulsed electric power provided to the induction coil and the frequency of pulsed electric power provided to the induction coil in the previous control cycle; and
Ps is a quotient of a value indicative for the current estimated power provided to the piece of cookware and a value indicative for the estimated power provided to the piece of cookware in the previous control cycle.

According to embodiments, within said control loop, on-time of pulsed electric power is varied. Preferably, on-time is varied while off-time is a constant. Preferably, on-time is varied while off-time is a constant. Thereby, power provided to the piece of cookware can be controlled according to the requested power.

According to embodiments, said updating of operating parameter of the switching element comprises defining a new value of off-time (T_off) of pulsed electric power. Thereby, pulse-width modulated electric power can be adapted according to current coil/pot coupling characteristics.

According to embodiments, off-time (T_off) remains unchanged within the control loop.

According to embodiments, said relation coefficient boundary is chosen according to current operating conditions of the power circuit portion, specifically according to induction coil characteristics and/or the chosen power level. More in detail, for example, size of the induction coil (e.g. coil diameter), inductivity value of the induction coil and/or resistance value of induction coil may be used for defining said relation coefficient boundary.

According to embodiments, said control loop is run as long as said relation coefficient boundary is crossed. Thereby, the power interruptions are minimized as much as possible.

According to embodiments, stability of a value indicative for the estimated power provided to the piece of cookware is checked within the control loop. Thereby, coupling changes are only detected by the control loop in case of stable power conditions in order to avoid superfluous power interruptions because of power fluctuations.

According to a further aspect, the invention relates to an induction hob. The induction hob comprises a power circuit portion with at least one switching element adapted to provide pulsed electric power to an induction coil and a control entity for controlling operating parameters of the switching element. Said control entity is adapted to perform a control loop with control cycles in order to detect coupling changes between the induction coil and a piece of cookware. Said control entity is adapted to perform control cycles including steps as follows:
receiving frequency information and power information at said control entity;
calculating at least one relation coefficient based on said frequency information and said power information; and
comparing said relation coefficient with a relation coefficient boundary, thereby deriving a comparison result;
the control entity being further adapted to decide, based on the comparison result, whether to:
perform a new control cycle of said control loop or whether to
stop said control loop and said provision of pulsed electric power to the induction coil and restart said control loop after updating an operating parameter of the switching element.

The induction cooking hob may comprise at least one or more of the following features:
wherein three or the at least three induction coils of the cooking zone of the induction cooking hob are arranged in a column, row and/or array,
wherein the induction coils are rectangular or oval shaped,
wherein a column, an array or a row of induction coils comprises at least three, at least four, preferably four, at least five or at least six induction coils,
wherein the induction coils are triangular shaped, in particular as isosceles triangles,
wherein three induction coils are arranged as an isosceles triangle,
wherein three or at least three induction coils are arranged concentrically,
wherein each induction coil has the same shape and size or wherein the induction coils have different shapes and/or sizes,
wherein the cooking zone includes three oval induction coils arranged as an isosceles triangle,
wherein the cooking zone includes three circular induction coils arranged as an isosceles triangle,
wherein the cooking zone includes three triangular, preferably isosceles triangular, induction coils arranged as an isosceles triangle,
wherein the induction cooking hob comprises four, at least four, eight or at least eight triangular shaped induction coils forming triangles,
wherein two triangles complement each other to a square,
wherein four triangles complement each other to a rectangle, wherein eight triangles complement each other to at least one or at least two squares, wherein eight triangles complement each other to a larger outer square and a smaller inner square and/or four small squares, wherein in particular the outer and the inner square are rotated to each other by 45°, wherein the induction cooking hob comprises at least one cooking zone, wherein the triangles are combined to at least one small square and/or smaller square and/or outer square to form a cooking zone, wherein at least one or each of the generators comprises one, at least one, at least two or two IGBTs (insulated-gate bi-polar transistors) and/or wherein the IGBTs operate as a full-bridge, half-bridge and/or as a quasi-resonant circuit.

"Relation coefficient" according to the present invention may refer to any coefficient which is indicative for changes of coupling coefficient between the induction coil and the piece of cookware placed above said induction coil.

"Relation coefficient boundary" according to the present invention refers to any boundary (upper boundary, lower boundary or range) which is used for determining whether the relation coefficient indicates a minor dynamic coupling characteristic change which requires no update of T_off or a significant dynamic coupling characteristic change which requires an update of T_off.

"Power provided to the piece of cookware", or respectively, "power provided to the induction coil" according to the present invention refers to a superimposition of two effects, namely power actually delivered to the pot and electric power losses within the coil.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which:

FIG. 3 shows a flow chart of a method for operating an induction hob including a control loop for determining dynamic coupling state changes.

DETAILED DESCRIPTION OF PREFERRED EMBODIMENTS

Figure 1:
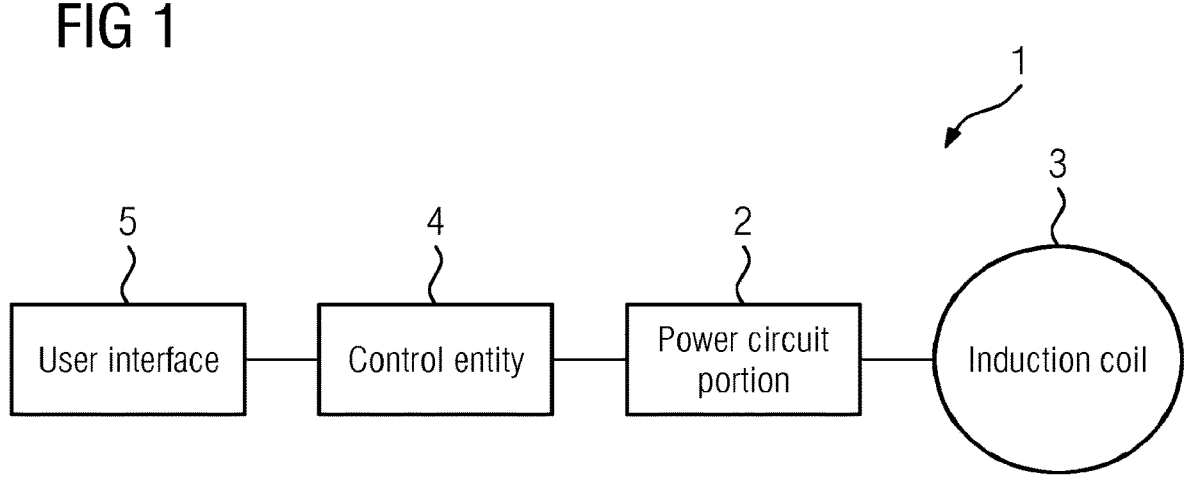
FIG. 1 shows an example block diagram of an induction hob.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 discloses a schematic diagram of an induction hob 1. The induction hob 1 comprises one or more induction coils 3 above which a piece of cookware can be placed in order to be heated. Furthermore, the induction hob 1 comprises a power circuit portion 2, said power circuit portion 2 being adapted to provide pulsed electric power to an oscillation circuit electrically coupled with the induction coil 3. In order to generate said pulsed electric power, the power circuit portion 2 comprises one or more switching elements. Said switching elements may be, for example, IGBTs.

The induction hob 1 comprises a user interface 5 for receiving user input. Said user interface 5 may be a touch-sensitive interface or a switch- or knob-based user interface. Based on said user interface 5, the user may provide a power request for a heating zone associated with the induction coil 3.

In order to reduce interruptions of provision of pulsed electric power for determining off-time of pulsed electric power, the induction hob 1 performs a control loop. Aim of said control loop is to detect coupling changes between the induction coil 3 and the piece of cookware and initiate an interruption only if strictly required. The control loop takes advantage of the physical delay of a quasi-resonant converter included in the power circuit portion 2 of the induction hob. It is worth mentioning that due to minor modifications of one or more operating parameters of the switching element, coupling changes between the induction coil 3 and the piece of cookware can be compensated without any interruption of power circuit portion (provision of pulsed electric power). Said minor modifications of one or more operating parameters are performed by a control loop.

Figure 2:
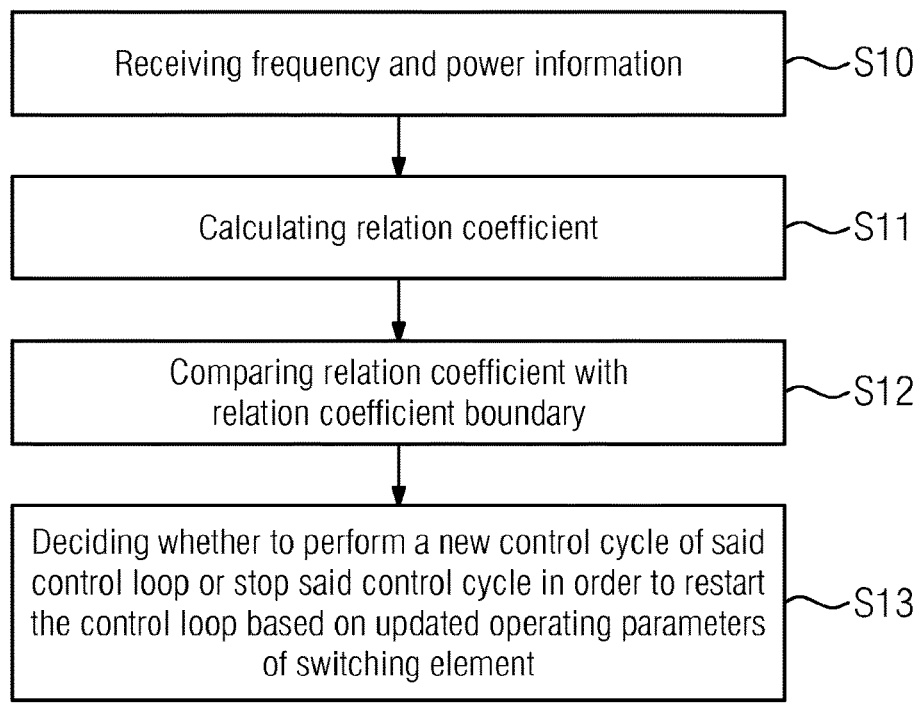
FIG. 2 shows a flow chart of a control loop cycle performed in an induction hob.

FIG. 2 illustrates steps performed through a control cycle of a control loop.

Before starting the control loop, the coupling between the induction coil 3 and the piece of cookware has to be determined. Said determination may be a measuring step. Based on said measurement result, an off-time (T_off) of pulsed electric signal provided to the switching element can be defined. In other words, the period of time in a duty cycle in which the switching signal provided to the switching element is low, can be determined based on the coupling state between the induction coil 3 and the piece of cookware. In order to obtain a reliable result of coupling state, multiple measurements for determining the coupling between the induction coil 3 and the piece of cookware may be performed.

In addition, a frequency range of the frequency of the pulsed electric power signal provided to the induction coil 3 (which is correlated with the frequency of the switching signal provided to the switching element) is determined. More in detail, a minimum driving frequency and a maximum driving frequency is determined. Said minimum driving frequency/maximum driving frequency values are used within the control loop to provide a power to the piece of cookware according to the user's power request.

After determining the coupling conditions (specifically off-time (T_off)) and the frequency range, the power circuit portion 2 may start the provision of power to the induction coil based on pulse width modulation (PWM) scheme. Specifically, electric power may be provided to the induction coil based on free running PWM mode. Said free running PWM mode is advantageous because it enhances the robustness of power control. In addition, it is possible to monitor and adjust pot/coil coupling state depending on pot position/detection.

After starting the provision of power to the induction coil by the power circuit portion 2, the control loop is started according to FIG. 2. Said control loop may be performed by said control entity 4, specifically a micro-processor-based control entity.

In a first step, frequency and power information are received (S10). Said frequency information may be the current frequency of the electric current provided through the induction coil 3, i.e. the frequency which is currently applied/measured in the present control cycle. Similarly, said power information may be the current electric power provided to the induction coil, respectively, the piece of cookware, i.e. the provided electric power in the present control cycle. Said power information may be provided by a power estimation entity.

According to embodiments, said frequency and power information may be directly used for calculating at least one relation coefficient (S11). According to other embodiments, trend information may be calculated based on said frequency and power information. Said trend information may be indicative for the change of frequency/power between two or more control cycles. For example, said trend information may be indicative for an increase/decrease of frequency/power over time.

According to an embodiment, frequency trend information may be calculated by the following formula:

$$Fs = \frac{f_{curr}[Hz]}{f_{prev}[Hz]}; \quad \text{(formula 1)}$$

wherein
$f_{curr}$ is the frequency in the present control cycle; and
$f_{prev}$ is the frequency in the previous control cycle.

Similarly, according to an embodiment, power trend information may be calculated by the following formula:

$$Ps = \frac{P_{curr}[W]}{P_{prev}[W]}; \quad \text{(formula 2)}$$

wherein
$P_{curr}$ is the power in the present control cycle; and
$P_{prev}$ is the power in the previous control cycle.

Based on said frequency and power information (which can be directly frequency/power values or frequency/power trend information), one or more relation coefficients are calculated.

A first relation coefficient Ds' may be indicative for the change of a multiplication result obtained by multiplying frequency information and power information. Said first relation coefficient Ds' may provide proportional trend information.

Specifically, said first relation coefficient Ds' may be calculated based on the following formula:

$$Ds'[\%] = \frac{Fs * Ps}{100\%}; \quad \text{(formula 3)}$$

wherein Fs and Ps are calculated according to formulas 1 and 2.

In addition, a second relation coefficient Ds" may be calculated. Said second relation coefficient Ds" may provide parabolic trend information.

Specifically, said second relation coefficient Ds" may be calculated based on the following formula:

$$Ds''[\%] = 100\% + \{(100\% - Fs[\%]) * (100\% - Ps[\%])\}; \quad \text{(formula 4)}$$

wherein Fs and Ps are calculated according to formulas 1 and 2.

In order to determine whether only slight changes of coupling between the induction coil 3 and the piece of cookware occurred which are not critical for the power circuit portion 2, i.e. the control loop can be continued, or coupling changes occurred which require an update of off-time (T_off), at least one relation coefficient is compared with a relation coefficient boundary (S12). Depending on the situation, respectively, working mode of the induction hob 1 (e.g. power level, temperature of the coil etc.), only the first or the second relation coefficient may be used for comparing with a respective relation coefficient boundary. In addition, also both relation coefficients may be used and compared with respective relation coefficient boundaries. Said relation coefficient boundaries may provide an upper boundary, a lower boundary or a range in which the respective relation coefficient should be included. The relation coefficient boundary may be determined considering coil characteristics, for example coil size, ohmic resistance of the induction coil and/or inductance value of the induction coil.

Based on said comparison step (S12) a comparison result is obtained. Said comparison result may indicate whether the relation coefficient crosses the relation coefficient boundary or not.

Based on said comparison result, a decision step can be performed (S13). In case that the relation coefficient boundary is not crossed, the control loop can be continued and a new control cycle is started. The other way round, if the relation coefficient boundary is crossed, said control loop may be stopped, at least one operating parameter is updated and the control loop is started based on said updated operating parameter(s).

According to an embodiment, in case of crossing the relation coefficient boundary, an operating parameter depending on the coupling state between the induction coil and the piece of cookware (specifically off-time T_off) can be updated. In addition, the frequency range (minimum driving frequency/maximum driving frequency) may also be updated.

Finally, the control loop is restarted based on said at least one updated operational parameter.

FIG. 3 shows an embodiment of a method for dynamic pot detection at an induction hob 1.

After starting, an input may be received at the user interface 5 (S20). Said input may be a power request for powering one or more induction coils associated with a heating zone. In case that the power request is not zero (S21), the coupling state between the induction coil and the piece of cookware is determined. Said coupling state may be determined based on one, preferably multiple coupling measurements. After performing said coupling measurements, off-time (T_off) currently required for the measured coupling state is determined (S22).

Following up, minimum frequency/maximum frequency of electric current provided to the induction coil may be determined based on said off-time (T_off) (S23). Based on said parameters, the power provision to the induction coil is started (S24). Said power provision may be started in free running pulse width modulation (PWM) mode.

After starting the power provision to the induction coil, the control loop (as indicated by the dashed box) as mentioned before is started. First of all, frequency information and power information is calculated (S25). Said calculation may include the calculation of frequency trend information Fs and power trend information Ps as mentioned before.

In order to obtain reliable results, a check may be made if calculated (specifically estimated) power information is stable (S26). If not, the method returns to step S25.

If calculated power information is stable, dynamic pot detection process is enabled to operate (S27). This means that only after power stabilization is achieved, parameters regarding dynamic pot detection are monitored.

Afterwards, upper-mentioned relation coefficients Ds' and Ds" are calculated (S28). As mentioned before, said relation coefficients are indicative for dynamic changes of the coupling between the piece of cookware and the induction coil.

In step S29 it is checked if the relation coefficient(s) cross(es) the relation coefficients boundary or not. If not, it is deemed that only slight changes in coupling state have occurred and the control loop can therefore start with a new control cycle without interrupting the power circuit portion. Otherwise, in case that the relation coefficients boundary is not met, the provision of pulsed electric power to the induction coil is stopped (S30) and the method returns to step S21 because a significant change of coupling state have been detected which may be detrimental for the switching elements included in the power circuit portion 2. Therefore, in case that the power request is not zero, T_off, respectively, the coupling characteristics between the induction coil and the piece of cookware is determined again (S22). Otherwise, in case that the power request is zero, the power circuit portion is deactivated, i.e. the provision of electric power to the induction coil is stopped (S31) and the method is terminated.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 induction hob
2 power circuit portion
3 induction coil
4 control entity
5 user interface

The invention claimed is:

1. A method for operating an induction hob having an induction coil and a power circuit comprising a switching element configured to provide pulsed electric power to the induction coil, the method comprising the steps of:
starting the providing the pulsed electric power to the induction coil by the power circuit and
performing a control loop with control cycles to detect coupling changes between the induction coil and a piece of cookware placed above the induction coil, wherein each control cycle comprises:
calculating a relation coefficient based on one or more operating parameters of said induction coil; and
comparing the relation coefficient and a relation coefficient boundary,
wherein if the relation coefficient does not cross the relation coefficient boundary, the control loop is continued with another control cycle, and
wherein if the relation coefficient crosses the relation coefficient boundary, the providing the pulsed electric power to the induction coil is stopped, at least one operating parameter of the switching element is updated, and the control loop is restarted with the updated at least one operating parameter.

2. The method according to claim 1, said one or more operating parameters of the induction coil comprising frequency information and power information relating to operation of said induction coil.

3. The method according to claim 2, wherein said frequency information is indicative of a current frequency of pulsed electric power provided to the induction coil, and wherein said power information is indicative of power currently provided to the piece of cookware.

4. The method according to claim 2, wherein said frequency information includes frequency trend information indicating a frequency change between different ones of said control cycles.

5. The method according to claim 2, wherein said power information includes power trend information indicating a power change between different ones of said control cycles.

6. The method according to claim 2, wherein the relation coefficient is calculated based on a multiplication of the frequency information and the power information.

7. The method according to claim 2, wherein said frequency information includes frequency trend information indicating a frequency change between different ones of said control cycles, wherein said power information includes power trend information indicating a power change between said different ones of said control cycles, and wherein the relation coefficient is calculated based on a multiplication of said frequency trend information and said power trend information.

8. The method according to claim 2, wherein the relation coefficient is calculated based on a multiplication of frequency deviations of the frequency information from a frequency target value and power deviations of the power information from a power target value.

9. The method according to claim 1, wherein the at least one operating parameter of the switching element comprises an off-time of pulsed electric power supplied to the induction coil via the switching element.

10. The method according to claim 1, wherein the relation coefficient comprises a first relation coefficient value (Ds') calculated based on the following formula:

$$Ds'[\%] = \frac{Fs * Ps}{100\%};$$

wherein:
Fs is a quotient between a current frequency of pulsed electric power provided to the induction coil and a prior frequency of pulsed electric power provided to the induction coil in a prior said control cycle, and
Ps is a quotient between a value indicative of a current estimated power provided to the piece of cookware and a value indicative of a prior estimated power provided to the induction coil in the prior control cycle,
wherein the relation coefficient boundary includes a first relation coefficient boundary value, and wherein the first relation coefficient value is compared to the first relation coefficient boundary value.

11. The method according to claim 10, wherein the relation coefficient comprises a second relation coefficient value (Ds") calculated based on the following formula:

$$Ds''[\%] = 100\% + \{(100\% - Fs[\%]) * (100\% - Ps[\%])\};$$

wherein the relation coefficient boundary includes a second relation coefficient boundary value, and wherein the second relation coefficient value is compared to the second relation coefficient boundary value.

12. The method according to claim 1, wherein within said control loop, on-time of pulsed electric power supplied to the induction coil is varied.

13. The method according to claim 1, wherein off-time of pulsed electric power supplied to the induction coil remains unchanged within the control loop.

14. The method according to claim 1, wherein said relation coefficient boundary is chosen based on current operating conditions of the power circuit.

15. The method according to claim 1, wherein said relation coefficient boundary is chosen based on characteristics of the induction coil and/or a chosen power level.

16. The method according to claim 1, wherein stability of a value indicative of estimated power provided to the piece of cookware is checked within the control loop.

* * * * *